United States Patent [19]

Chung

[11] Patent Number: 5,738,246
[45] Date of Patent: Apr. 14, 1998

[54] DISPOSABLE CUP DISPENSING DEVICE

[76] Inventor: Chih-Wen Chung, P. O. Box 82-144, Taipei, Taiwan

[21] Appl. No.: 690,386

[22] Filed: Jul. 26, 1996

[51] Int. Cl.$^6$ .................................................. B65H 3/28
[52] U.S. Cl. .......................... 221/222; 221/249; 221/297
[58] Field of Search ............................... 221/222, 249, 221/297, 299, 247, 248

[56] References Cited

U.S. PATENT DOCUMENTS

| | | | |
|---|---|---|---|
| 1,095,319 | 3/1914 | Erwin | 221/222 |
| 1,634,566 | 7/1927 | Wessman | 221/222 |
| 1,654,004 | 12/1927 | Lind | 221/222 |
| 1,662,593 | 3/1928 | Wessman | 221/222 |

FOREIGN PATENT DOCUMENTS 2212793  8/1989  United Kingdom .................. 221/222

*Primary Examiner*—William E. Terrell
*Assistant Examiner*—Khoi M. Tran
*Attorney, Agent, or Firm*—A & J

[57] ABSTRACT

A disposable cup dispensing device having an upper annular member and a bottom annular member connected together. A barrel is mounted on the upper annular member to hold a stack of disposable cups. A pivotable bottom cover is located at the bottom annular member. An endless cord is mounted in between the upper and the bottom annular member to hold a plurality of actuating plates located in radial grooves inside the upper and the bottom annular members. A link is connected between the bottom cover and one of the actuating plates. A spring with a curving upward tail is located on the inside of the bottom cover and pivoted therewith. When the bottom cover is opened, the link is lifted to twist the endless cord and to turn the actuating plates, thereby causing the plates to pull one of the disposable cup downwardly, permitting it to fall onto the curved tail of the spring member of the bottom cover.

2 Claims, 5 Drawing Sheets

5,738,246

1

DISPOSABLE CUP DISPENSING DEVICE

BACKGROUND OF THE INVENTION

1. Field of the Invention

This invention relates to a disposable cup dispensing device for holding and dispensing disposable cups, and relates more particularly to such a disposable cup dispensing device which automatically dispenses one disposable cup for service when the bottom cover thereof is opened.

2. Description of the Prior Art

Disposable cups are commonly provided in public places nearby drinking fountains for holding drinking water for drinking. Conventionally, cup racks are used to carry disposable cups for service. However, because these cup racks are not enclosed, dust tends to pass to the inside, thereby causing the disposable cups to be contaminated. Furthermore, when pulling a disposable cup out of the bottom output port of the cup rack, several disposable cups may be simultaneously pulled out of the cup rack to fall to the ground.

SUMMARY OF THE INVENTION

This invention relates to a disposable cup dispensing device for holding and dispensing disposable cups, and relates more particularly to such a disposable cup dispensing device which automatically dispenses one disposable cup for service when the bottom cover thereof is opened.

It is another object of the present invention to provide a disposable cup dispensing device which automatically dispenses one disposable cup each time when the bottom cover thereof is opened. According to the preferred embodiment of the present invention, the disposable cup dispensing device comprises an upper annular member and a bottom annular member connected together, a barrel mounted on the upper annular member to hold disposable cups, a bottom cover pivoted to the bottom annular member, an endless cord mounted in between the upper annular member and the bottom annular member to hold a plurality of actuating plates in radial grooves inside the upper annular member and the bottom annular member, a link connected between the bottom cover and one actuating plate, and a spring pivoted to the bottom cover on the inside and having a tail curving upwards, wherein the link is lifted to twist the endless cord and to turn the actuating plates when the bottom cover is opened, thereby causing the actuating plates to pull one disposable cup downwards, permitting it to fall onto the curved tail of the spring member of the bottom cover for service.

DETAILED DESCRIPTION OF THE PREFERRED EMBODIMENT

Figure 1:
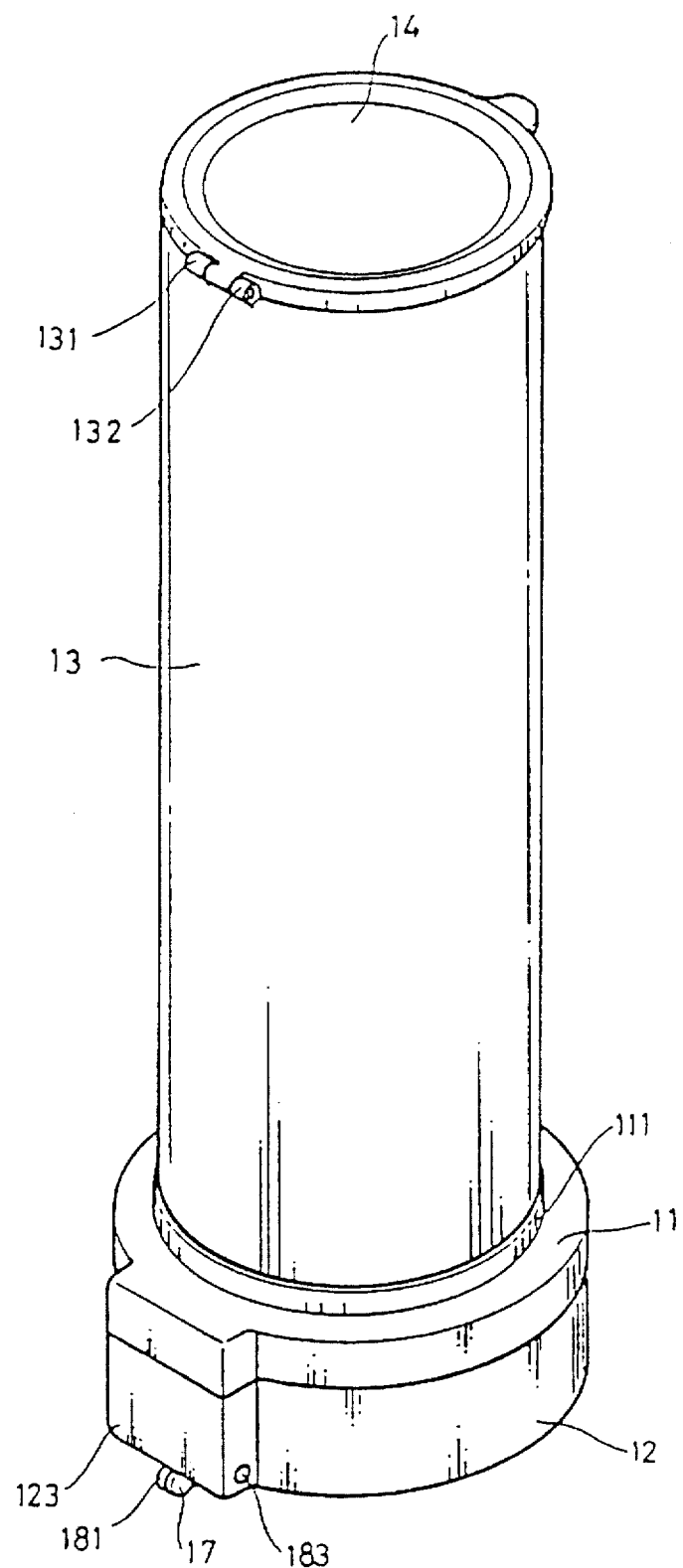
FIG. 1 is an elevational view of a disposable cup dispensing device according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
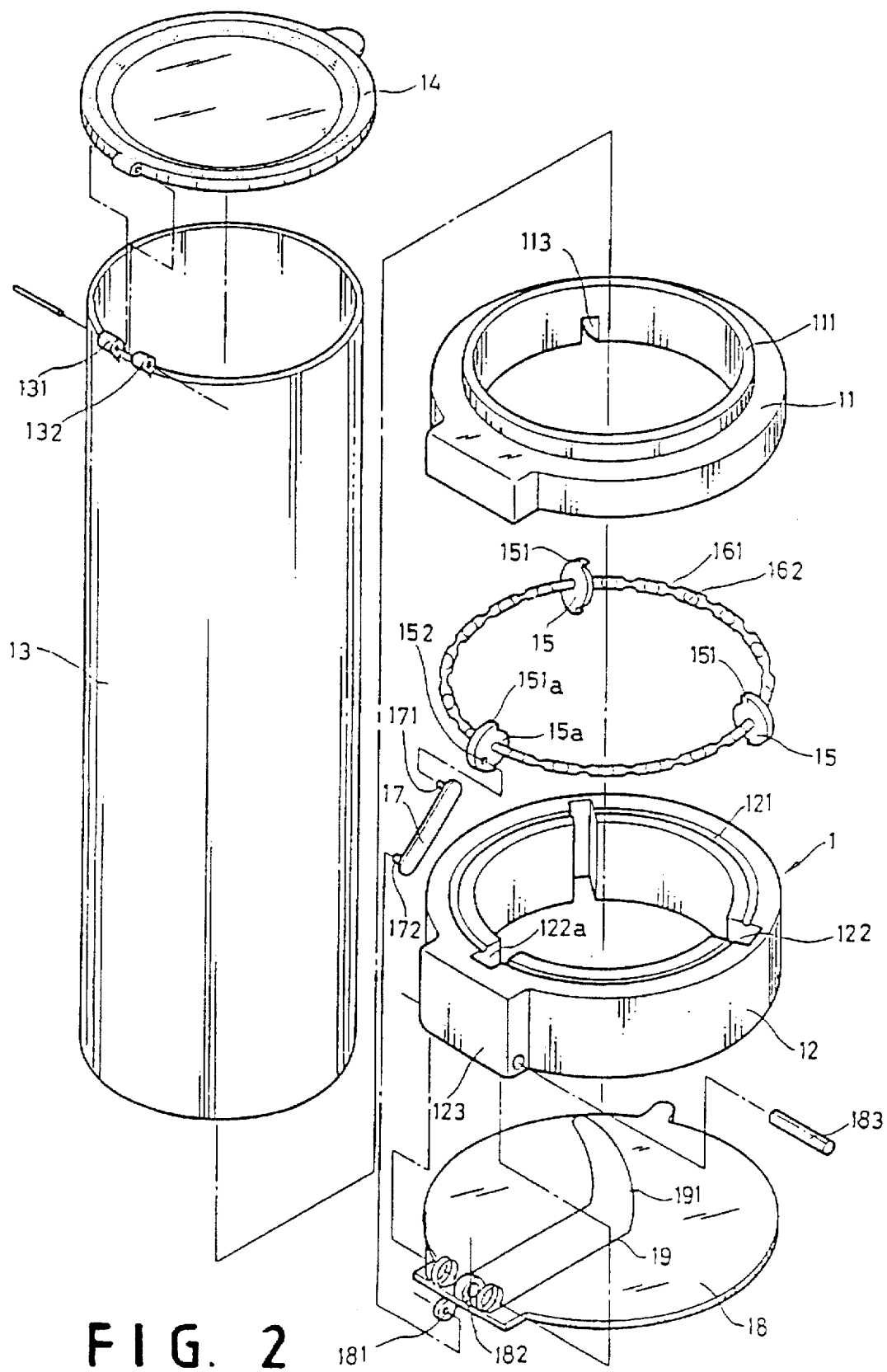
FIG. 2 is an exploded view of the disposable cup dispensing device shown in FIG. 1.

Referring to FIGS. 1 and 2, a disposable cup dispensing device in accordance with the present invention is generally comprised of an annular base 1, which is comprised of an upper annular member 11 and a bottom annular member 12, and a barrel 13 mounted on the base 1 and adapted for holding disposable cups. The barrel 13 has lugs 131, 132 raised from the periphery at the top. A lid 14 is pivoted to the lugs 131, 132 and covered on the top end of the barrel 13. The upper annular member 11 comprises an upright annular flange 111 raised from the top and coupled to the bottom end of the barrel 13, a bottom annular groove 112 (not shown) disposed at the bottom, and a plurality of radial grooves 113 respectively extending from the bottom annular groove 113. The bottom annular member 12 comprises a top annular groove 121 disposed at the top and closely attached to the bottom annular groove 112 of the upper annular member 11, a plurality of radial grooves 122 respectively extending from the top annular groove 121 corresponding to the radial grooves 113 of the upper annular member 11, and a block 123 raised from the periphery on the outside. A bottom cover 18 is covered on the bottom side of the bottom annular member 12, having lugs 182 pivotably connected to the block 123 of the bottom annular member 12 by a pivot 183, and an eye 161 adjacent to the lugs 182. A spring member 19 is turned about the pivot 183, having a curved tail 191 upstanding from the bottom cover 18 and projecting into the base 1 and the barrel 13. An endless cord 16 is mounted within the bottom annular groove 112 and top annular groove 121 and retained between the upper annular member 11 and the bottom annular member 12. A plurality of actuating plates 15 are respectively mounted on the endless cord 16 and received in the radial grooves 113, 122. Each of the actuating plates 15 have a plurality of smoothly curved hooked portions 151 raised from the periphery. One actuating plate 15a which is received in a radial groove 112a corresponding to the block 123 has a pivot hole 152. A link 17 is received in the radial groove 112a, having a first pivot pin 171 at one end coupled to the pivot hole 152 of the actuating plate 15a, and a second pivot pin 172 at an opposite end coupled to the eye 181 of the bottom cover 18. The endless cord 16 has a plurality of recessed surface portions 161, 162 alternatively arranged at right angles. The arrangement of the recessed surface portions 161, 162 enables the endless cord 16 to be twisted to turn the actuating plates 15 in the same direction when one actuating plate 15 is rotated.

Figure 3:
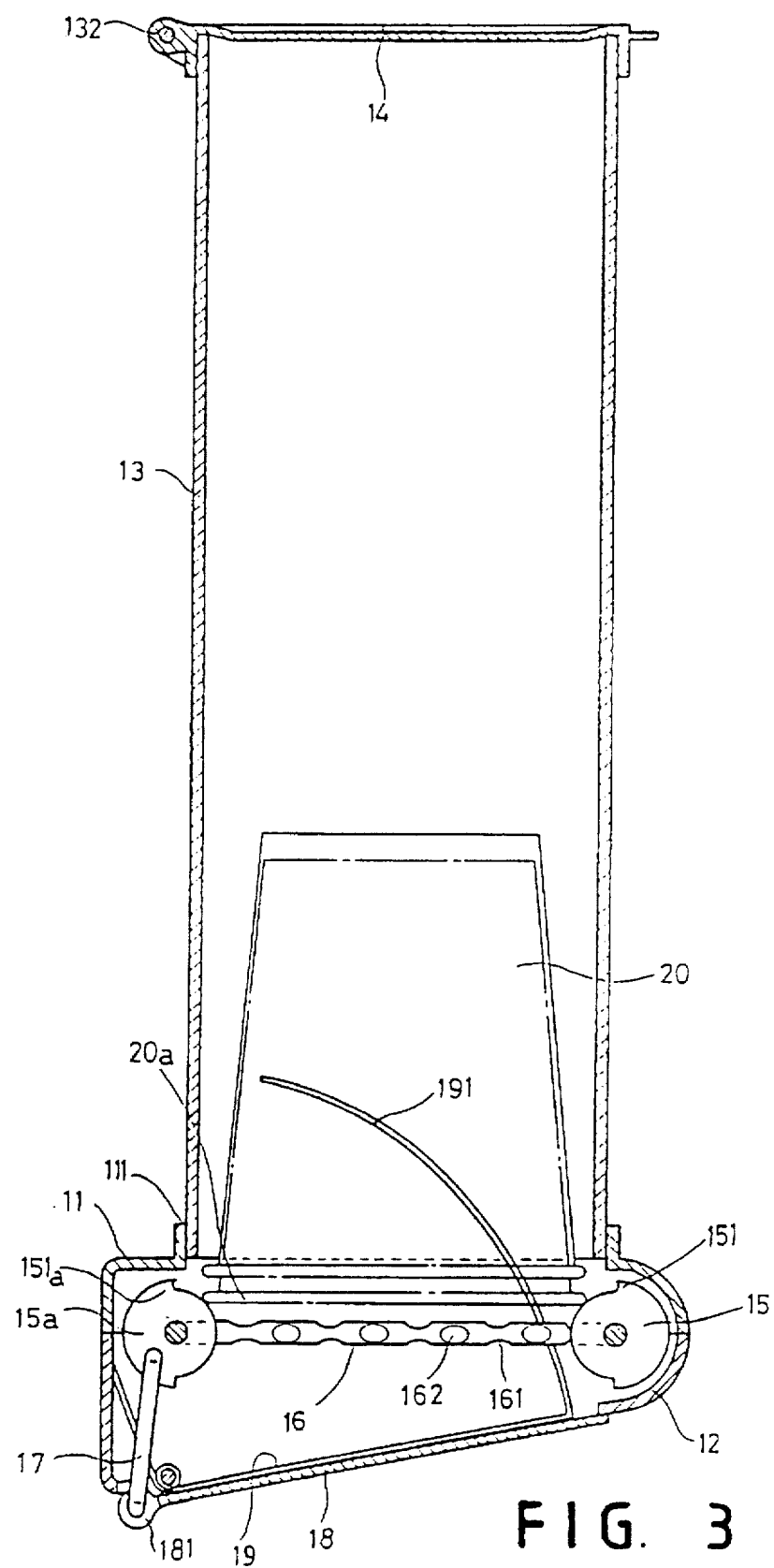
FIG. 3 is a sectional view of the disposable cup dispensing device shown in FIG. 1, showing the bottom cover closed.

Referring to FIG. 3, when a stack of disposable cups 20 is put in the barrel 13, the periphery of the bottom disposable cup 20a is supported on the periphery of the actuating plates 15, therefore the disposable cups 20 do not fall out of the barrel 13.

Figure 4:
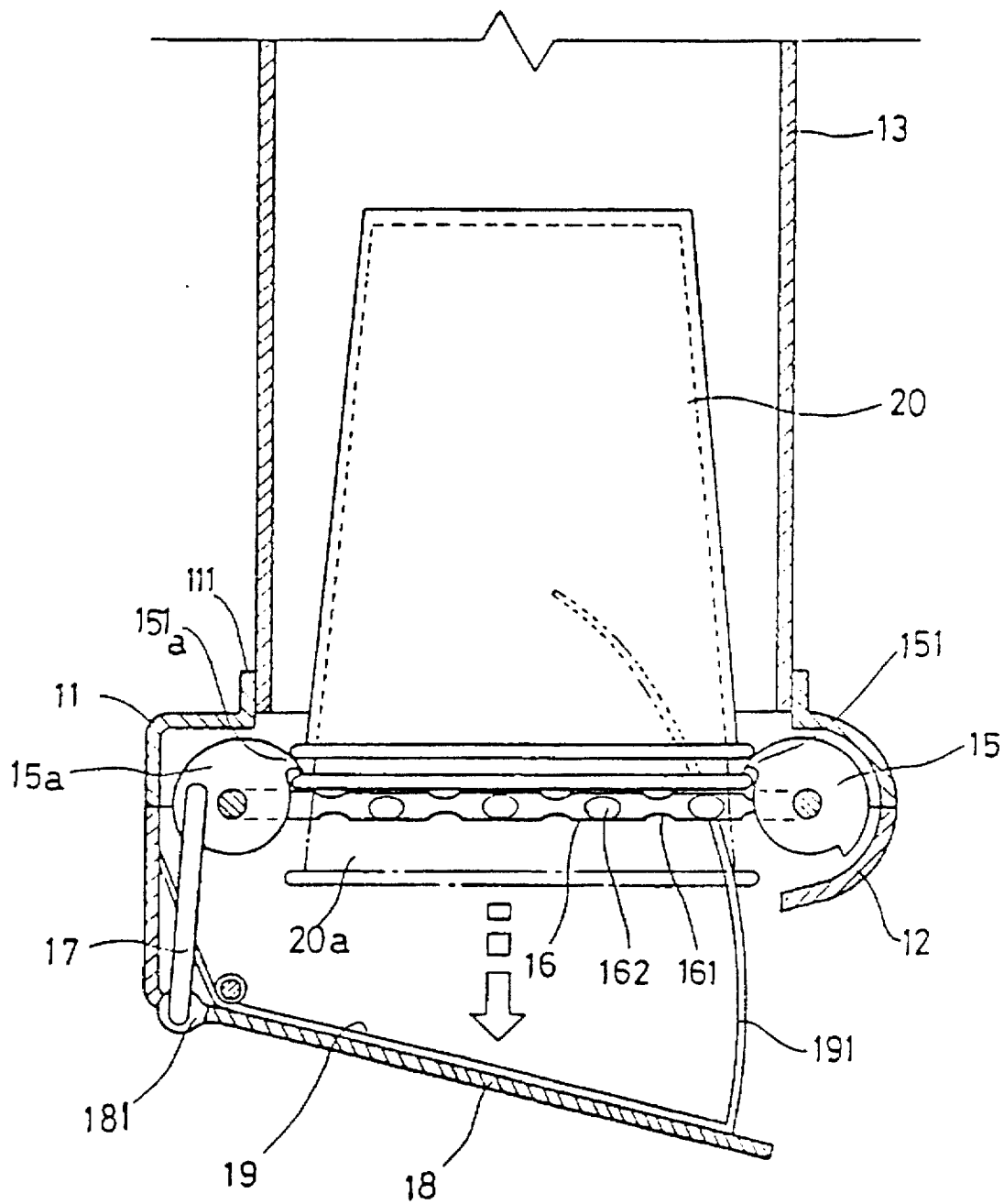
FIG. 4 is another sectional view of the present invention, showing the bottom cover turned downwards from the close position toward the open position.

Referring to FIG. 4, when the bottom cover 18 is turned downwards from the bottom annular member 12, the link 17 is forced upwards to turn the connected actuating plate 15a, thereby causing the endless cord 16 to be twisted to turn the other actuating plates 15 in the same direction, and therefore the smoothly curved hooked portions 151, 151a of the actuating plates 15, 15a are forced to pull the rim of the bottom disposable cup 20a downwards. When the bottom disposable cup 20a downwards, it immediately falls from the barrel 13 onto the curved tail 191 of the spring member 19.

Figure 5:
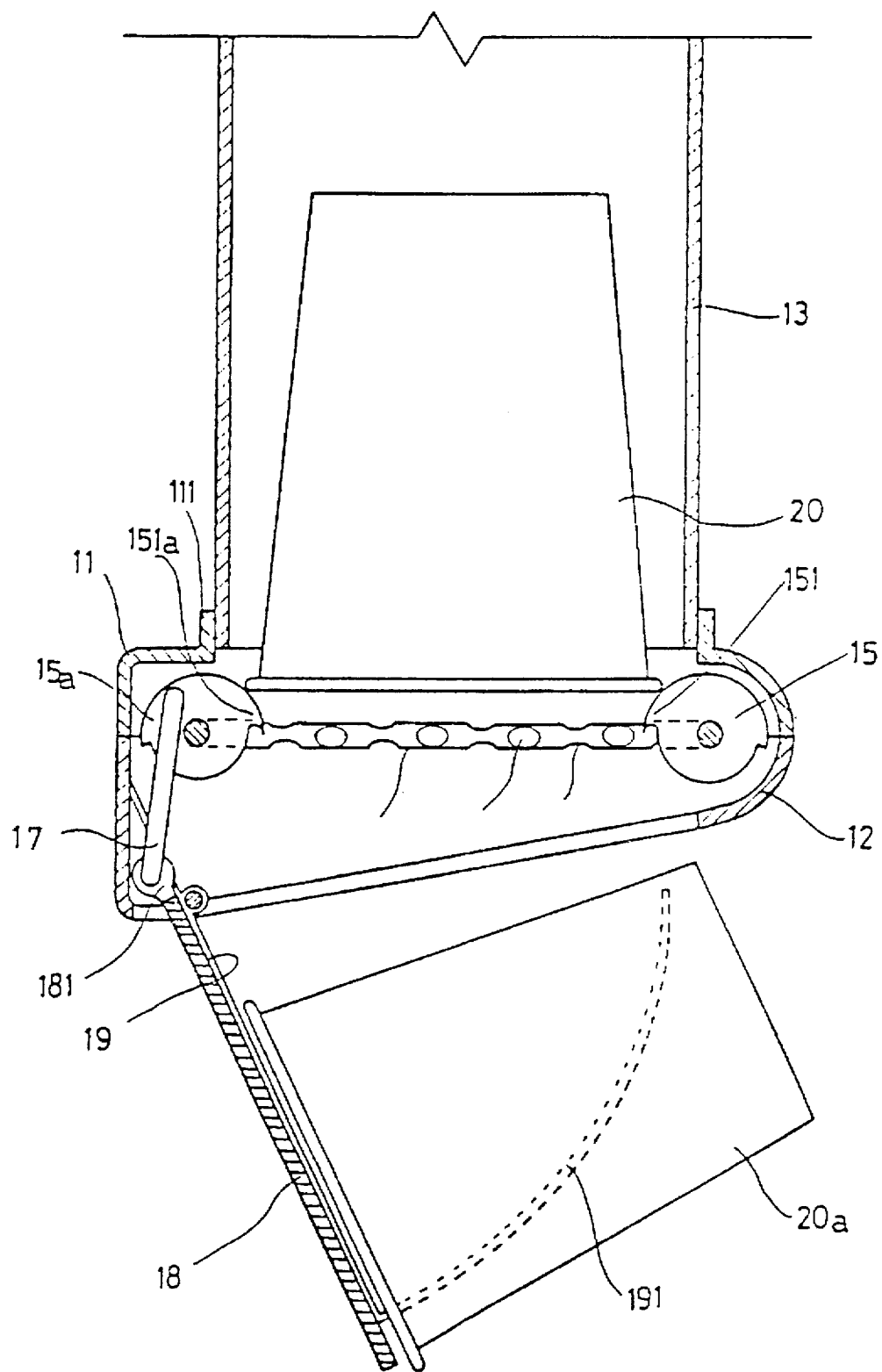
FIG. 5 is still another sectional view of the present invention, showing the bottom cover opened, and a disposable cup carried out of the barrel.

Referring to FIG. 5, when the bottom cover 18 is continuously turned downwards, the disposable cup 20a is carried on the curved tail 191 of the spring member 19 and moved out of the bottom annular member 12 for use, and at the same time the smoothly curved hooked portions 151, 151a pass over the rim of the next disposable cup 20, thereby causing the rest disposable cups 20 to be stopped at the periphery of the actuating plates 15, 15a.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A disposable cup dispensing device comprising:

a base, said base comprised of an upper annular member and a bottom annular member vertically attached together, said upper annular member comprising an upright annular flange raised from a top side thereof, a bottom annular groove disposed at a bottom side thereof, and a plurality of radial grooves respectively extending from said bottom annular groove, said bottom annular member comprising a top annular groove disposed at a top side thereof and attached to the bottom annular groove of said upper annular member, a plurality of radial grooves respectively extending from said top annular groove in communication with the radial grooves of the upper annular member, and a block raised from the periphery on the outside;

a barrel mounted on said upper annular member around said upright annular flange and adapted for holding disposable cups, said barrel having a bottom open end coupled to the top annular member of said base, a top open end, and a pivoted lid covered on said top open end;

a bottom cover pivotably connected to the block of said bottom annular member by a pivot to close the bottom open end of said barrel, said bottom cover comprising a plurality of lugs pivotably connected to the block of said bottom annular member by a pivot, a curved spring member turned about said pivot, and an eye adjacent to said pivot;

an endless cord mounted within the bottom annular groove of said upper annular member and the top annular groove of said bottom annular member and retained between said upper annular member and said bottom annular member, having a plurality of actuating plates secured thereto and respectively received in the radial grooves of said upper annular member and said bottom annular member, each of said actuating plates having two smoothly curved hooked portions raised from the periphery at two opposite sides, and a link received in one radial groove of said bottom annular member and connected between the eye of said bottom cover and one of said actuating plates;

where in said link is lifted to twist said endless cord and to turn said actuating plates when said bottom cover is opened, thereby causing the smoothly curved hooked portions of said actuating plates to pull one disposable cup downwards from said barrel, permitting it to fall onto said curved spring member of said bottom cover.

2. The disposable cup dispensing device as claimed in claim 1, wherein said curved spring member has a tail curving upwards and upstanding from said bottom cover.

* * * * *